BEST AVAILABLE COPY

H. J. KENT.

Improvement in Potato Planters.

No. 4,790. Reissued March 5, 1872.

Witnesses.
C. P. Burgess
H. Lansing Perrine.

Inventor:
Hiram J. Kent
by
H. R. & Peck
atty.

UNITED STATES PATENT OFFICE.

HIRAM J. KENT, OF PALMYRA, NEW YORK.

IMPROVEMENT IN POTATO-PLANTERS.

Specification forming part of Letters Patent No. 111,217, dated January 24, 1871; reissue No. 4,790, dated March 5, 1872.

*To all whom it may concern:*

Be it known that I, HIRAM J. KENT, of Palmyra, in the county of Wayne and State of New York, have invented new and useful Improvements in Potato-Planters; and I do hereby declare the following to be a full, clear, and exact description thereof, sufficient to enable those skilled in the art to which my invention appertains to fully understand and to make and use the same, reference being had to the accompanying drawing forming part of this specification, in which—

Figure 1:
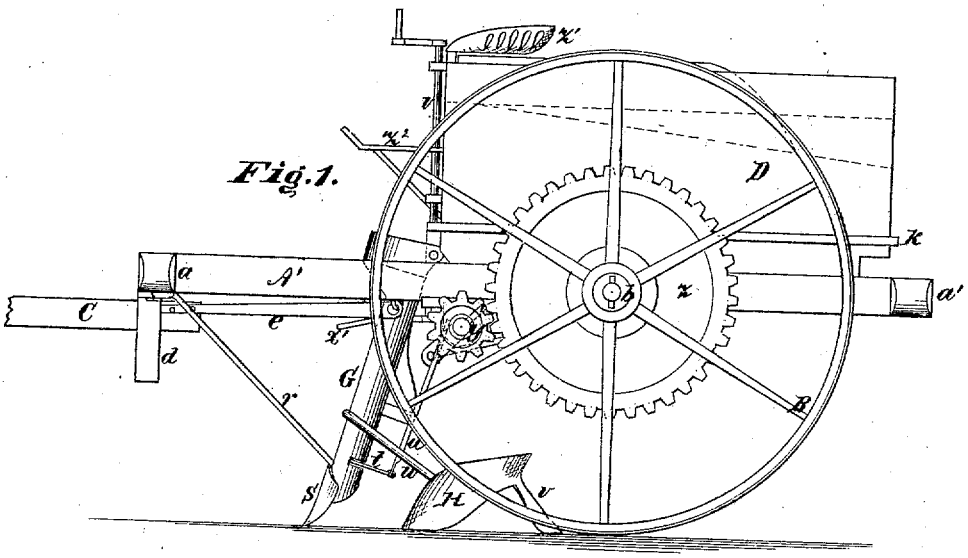
Figure 2:
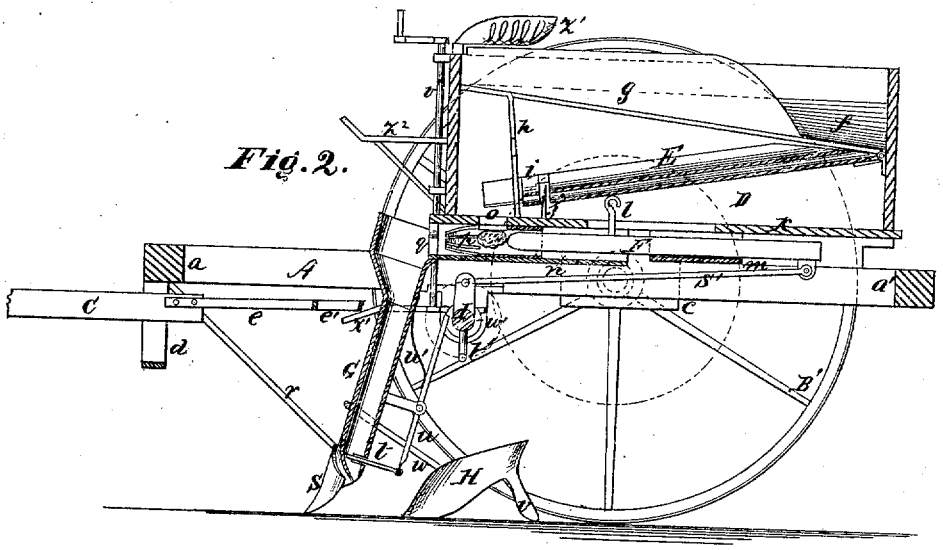
Figure 3:
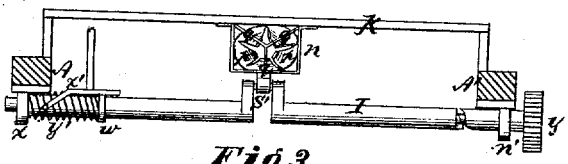

Figure 1 is a side elevation of a planter constructed according to my invention. Fig. 2 is a longitudinal central section of the same; and Fig. 3 represents a view of the cutters and centering-springs, and other detached features of my machine.

The object of my invention is to furnish a machine for planting potatoes, in which the potatoes will be cut into suitable pieces and discharged either in hills or in drills formed by the machine, and covered with earth automatically. The invention consists in the construction and arrangement of the cutting devices, and in the mechanism for conveying the potatoes from the hoppers to the cutters, thence to the hose or tube and discharging them at regular intervals, as hereinafter more fully described.

A A′ represent the side pieces, and *a a′* the front and rear cross-pieces, respectively, of a frame-work made in rectangular form. This frame is balanced upon the axle-journals *b b′* of the driving-wheels B B′. The journals are secured to the side pieces A A′ of the frame by means of plates *c c*. C is the tongue, attached, within a loop, *d*, to draft-bars *e e′*, which are connected to the side bars A A′ in such a manner as to have a slight vertical play. Mounted upon the balanced frame, between the draft-wheels, is a box, D, in the upper part of which is formed the hopper, wherein the seed-potatoes are placed. The bottom of this hopper is composed of two plates, *f f*, having a downward inclination toward the center of the rear end. Between the inner edges of these plates, which are provided with vertical sides *g g*, is a space extending the entire length of the hopper, in which is placed a trough, E, hinged at its rear end to the box, and preferably made V-shaped in its cross-section, but with a flat bottom. At its front end the trough is cut out, leaving only the sides, which pass through the slotted stationary plate *h*, which is formed with a tongue, *i*, projecting into the trough. *j* is a plate fixed to the bottom *k* of the box D, which passes through a transverse opening in the hinged trough, and serves as a cut-off. The trough E is operated—that is, alternately raised and lowered—by a projection, *l*, on a plunger, F, which has a reciprocating motion in bearings *m n* attached to the under side of the bottom *k* of box D, the projection *l* working in a slot in said bottom. *o* is an opening in the bottom *k*, immediately under the front end of the trough. Within the small casing *n*, which forms the forward bearing for the plunger, are secured several springs, *p p*, of the form shown. The office of these springs is to conduct the potato, as it is carried forward by the plunger, to the center of the three-edged knife *q*. This knife is secured within the front portion of the casing or bearing *n*, as seen clearly in Fig. 3. G represents the tube, which receives the cuttings from the knife and delivers them into the ground. This tube has an enlarged mouth, and it is rigidly attached to the front of the casing *n*, and is also strengthened by brace *r* running to the forward cross-bar of the frame. *s* is the opener or shovel, secured to the lower end of the tube G, and opens the drill to receive the seed. *t* represents a valve, which slides back and forth in a slot in the delivery-tube. This valve regulates the passage of the cuttings, and it is connected with a pivoted lever, *u*, through which it is operated, as will be presently explained. H is a coverer, made with curved lateral wings, which serve to fill in the earth from the sides of the drill or trench, and a rear portion, *v*, for leveling or properly shaping the surface. This device may be attached, by rods *w*, to the tube G, or to the frame, and it effectually closes the trench after the potato-cuttings have been deposited therein. Motion is given to the plunger F and to the regulating-valve by means of a crank-shaft, I, one end of which passes loosely through a bearing, *x*, attached to one of the side bars A, while the other fits into a tubular clutch forming part of a pinion, *y*, which rotates freely within a bearing, *n′*, fastened to the bar A′, as will be readily understood by reference to Fig. 3. The pinion *y* gears with a large wheel, *z*, keyed to the hub of one of the driving-wheels. *s′* is a pitman-rod, connecting the crank-shaft I with the plunger F; and *t* is a tappet on said shaft, which, by contact with the end of the lever *u*, operates the regulating-valve in the delivery-tube. *u′* is a spring attached to the tube G, and pressing against the lever *u*. The function of this spring is to close the valve after it is opened by the contact of the tappet *t′*. The driving mechanism is thrown out of gear by means of a vertical shaft, *v′*, provided with a foot, which, by contact with a collar, *w′*, on the crank-shaft I, (the shaft *v′* being operated by the driver,) moves the crank-shaft out of engagement with the clutch, in which position it is retained by an arm, *x′*, at the lower end of the shaft *v′* entering a notch in the upper surface of the draft-bar *e′*. *y* is a spiral spring, arranged upon the crank-shaft I between the collars *w′* and bearing *x*, which, as soon as the shaft *v′* is turned to the right, throws the crank-shaft back into engagement with the clutch. The shaft *v′* is provided with a handle, which is within easy reach of the driver. $z^1$ is the driver's seat upon the top of the casing D, and $z^2$ is the foot-rest below.

It should be here stated that the object in balancing the main frame and attaching the pole to loosely-connected draft-bars within a loop is to permit the driver, while occupying his seat, to tilt the frame backward for the purpose of facilitating the movement of the potatoes toward the rear of the hopper and into the trough.

The operation is as follows: As the machine is drawn forward the potatoes, which are carried in the hopper, will, by the motion of the machine, and on account of the inclination of the bottom of the hopper, (the effect of which may be increased by tilting the frame,) be shaken into the trough, by the rising-and-falling motion of which they will descend until arrested by the plate *j*. At each upward motion of the trough one potato will pass the plate (the trough having risen above it) and strike against the tongue *i*, which stops the process until the trough descends. Then the potato passes under the tongue and falls into the box in front of the plunger, which is, at this time, drawn back, as shown in Fig. 2. The forward motion of the plunger occurring, the potato is carried past the springs *p*, which, whether the potato be large or small, bring it in line with the center of the knife, against which it is now forced by the plunger, and thereby divided into pieces of nearly equal size, the cuttings falling into the delivery-tube G, and thence into the trench prepared by the opener, the valve in the tube equalizing the delivery by its regular movements, which alternately open and close the passage. The coverer follows immediately after, and covers the potatoes in the trench or furrow. When turning the machine, or driving over the road to and from the field, the planting mechanism is thrown out of gear, as above described.

The distance between the deposits of cuttings may be varied by changing the pinion on the crank-shaft, substituting a larger or smaller one, as may be required.

Having practically tested my improved machine, it has proven successful; and, instead of depositing the potatoes in compact hills, it may be used to drop the cuttings in drills at short intervals or spaces between the pieces of seed.

Having fully described my improvements in potato-planters, what I claim, and desire to secure by Letters Patent, is—

1. The knife *q*, or its equivalent, in combination with the centering guide-springs *p*, for cutting the seed, operated substantially as and for the purpose specified.

2. The combination of the centering-springs *p*, knife *q*, plunger F, and the mechanism for imparting motion to the latter, all constructed, arranged, and operating substantially as described.

3. The box D, arranged upon the tilting-frame, and provided with the inclined bottom *f g*, the hinged trough E operated through the the plunger, and the vertical stationary plate *h j*, all constructed, arranged, and operating substantially as and for the purposes described.

4. The combination of the mechanism for cutting the potatoes, consisting of the knife *q* and springs *p*, and their connections, with the delivery mechanism, consisting of valve *t* and its connecting and operating mechanism, substantially as and for the purposes described.

In testimony whereof I have hereunto set my hand this 24th day of July, 1871.

HIRAM J. KENT.

Witnesses:

H. P. K. PECK,
A. C. PARSONS.